United States Patent
Gulliford et al.

(10) Patent No.: US 6,618,355 B1
(45) Date of Patent: Sep. 9, 2003

(54) SERVICE TARIFFING BASED ON USAGE INDICATORS IN A RADIO BASED NETWORK

(75) Inventors: Philip C. Gulliford, Longwood, FL (US); Brian J. Andrew, Longwood, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/307,526

(22) Filed: May 7, 1999

(51) Int. Cl.[7] ................................................ H04J 1/16
(52) U.S. Cl. ........................................ 370/230; 370/468
(58) Field of Search .............................. 370/351, 468, 370/229, 230, 238, 252, 322, 331; 455/423; 709/202, 203, 224

(56) References Cited

U.S. PATENT DOCUMENTS

| | | | | |
|---|---|---|---|---|
| 5,557,746 A | * | 9/1996 | Chen et al. ................ | 709/202 |
| 5,706,333 A | * | 1/1998 | Grenning et al. .......... | 455/423 |
| 5,787,253 A | * | 7/1998 | McCreery et al. ......... | 370/351 |
| 5,793,753 A | * | 8/1998 | Hershey et al. ............ | 370/252 |
| 5,951,644 A | * | 9/1999 | Creemer ..................... | 370/229 |
| 6,072,773 A | * | 6/2000 | Fichou et al. .............. | 370/230 |
| 6,205,336 B1 | * | 3/2001 | Ostrup et al. .............. | 370/331 |
| 6,304,551 B1 | * | 10/2001 | Ramamurthy et al. ...... | 370/252 |
| 6,381,632 B1 | * | 4/2002 | Lowell ....................... | 709/224 |
| 6,405,251 B1 | * | 6/2002 | Bullard et al. ............. | 709/224 |
| 6,498,786 B1 | * | 12/2002 | Kirkby et al. .............. | 370/322 |

OTHER PUBLICATIONS

White Papers: Cisco Billing Architecture; 1992–1999; Cisco Systems, Inc.

* cited by examiner

*Primary Examiner*—Salvatore Cangialosi
(74) *Attorney, Agent, or Firm*—Fulbright & Jaworski L.L.P.

(57) ABSTRACT

The system provides a distributed decentralized network architecture. Network routing is performed at each node in the network, as opposed to the centralized architecture's single POP. Each node is typically an access point to the network, and it collects the relevant traffic statistics for subscribers connecting at that node. This is accomplished by a network switching/control element contained within the (Invisible Fiber Unit) IFU. The information is collected from the switching/control element contained within the IFU. The information is collected from the switching element by the IFU's CPU. This information can then be pre-processed locally, or sent directly to a central billing facility, for further processing, eventually resulting in the creation of the subscriber's bill. Essentially, it is only billing information that flows back to a central point, rather than the data traffic itself.

77 Claims, 3 Drawing Sheets

| SUBSCRIBER ELEMENT ADDRESS | DATA THROUGH NETWORK ELEMENT (GIG BITS) | REFERENCE TIME STAMP (START) | REFERENCE TIME STAMP (END) |
|---|---|---|---|
| A | 827,498 | 3/10/99 10:22AM | |
| B | 2,634,020 | 3/10/99 10:22AM | 3/11/99 8:32PM |
| B | 423,061 | 3/11/99 8:32PM | |
| ⋮ | | | |
| | | | |

*FIG. 5A*

| SUBSCRIBER OR NETWORK ELEMENT ADDRESSOR | SUBSCRIBER OR NETWORK ELEMENT ADDRESSEE | DATA QUANTITY (GIG BITS) | REFERENCE TIME STAMP (START) | REFERENCE TIME STAMP (END) |
|---|---|---|---|---|
| A | C | 826,342 | 3/10/99 10:22AM | |
| A | B | 1,036 | 3/10/99 10:22AM | 3/11/99 8:32PM |
| A | B | 120 | 3/11/99 8:32PM | |
| B | A | 326 | 3/10/99 10:22AM | 3/11/99 8:32PM |
| B | A | 137 | 3/11/99 8:32PM | |
| ⋮ | | | | |

*FIG. 5B*

SERVICE TARIFFING BASED ON USAGE INDICATORS IN A RADIO BASED NETWORK

REFERENCE TO RELATED APPLICATIONS

Reference is made to the following and commonly assigned U.S. Patent Application entitled SYSTEM AND METHOD OF CONTROLLING CO-CHANNEL INTERFERENCE IN POINT TO POINT COMMUNICATIONS, Ser. No. 09/162,967, filed Sep. 29, 1998, now abandoned, and commonly assigned U.S. Patent Application entitled SYSTEM AND METHOD FOR ESTABLISHING A POINT TO POINT RADIO SYSTEM, Ser. No. 09/140,295, filed Aug. 25, 1998, now U.S. Pat. No. 6,246,380, and commonly assigned U.S. Patent Application entitled COMMERCIAL NETWORK TOPOLOGIES UTILIZING POINT TO POINT RADIOS, Ser. No. 09/245,701, filed Feb. 6, 1999, now U.S. Pat. No. 6,366,584 the disclosures of which are incorporated herein by reference.

TECHNICAL FIELD

This invention relates to an information communication network utilizing a plurality of high bandwidth wireless links, and more particularly to providing tariffing based on actual use of the network for information communication by subscribers.

BACKGROUND

FIG. 1 illustrates a prior art solution for providing telephone and data services to a business or subscriber. A subscriber 126 is connected to a central office (CO) 115 using, for example, one 1.544 Mbps T1 line connections 101. The subscriber usually buys or leases this T1 line from a telephone service provider company (telco), such as a regional bell operating company (RBOC), at a predetermined flat rate cost, such as $1,500 per month. A subscriber with communication requirements exceeding those serviceable by a single T1, whether such demand is an instantaneous bandwidth requirement sufficient to demand the temporary capacity of multiple T1 connections or a continuous bandwidth requirement only slightly larger than a single T1, may purchase or lease multiple T1 line connections, such as T1 line connections 103 and 104 coupling subscriber 127 to CO 115.

The central office may communicate signals to and from these connections, such as T1 lines 101–104, to/from a service provider or other point in the communication network, such as ISP (Internet service provider) 120, through the point of presence (POP) connection 114. The POP connection 114 is generally composed of one or at least a fewer number of T1 lines than that existing between the central office and the subscribers coupled thereto, requiring the subscribers to share the bandwidth between the CO 15 and the POP 114.

Accordingly, a drawback to this solution is that a subscriber, while paying for a T1 line, is often not receiving the full T1 throughput. Specifically, although the subscriber is provided T1 service between the subscriber location and the CO, the CO to service provider connection may be concentrated to the point that any particular subscriber is unable to realize their purchased bandwidth through the signal path coupling the subscriber with a particular service provider.

Moreover, the subscribers, especially in the data communication associated with data processing systems, such as those often coupled to an ISP of the above example, often have large instantaneous bandwidth requirements surrounded by prolonged minimal or nominal bandwidth requirements. For example, a data processing system coupled to another data processing system through CO 115 may require the download of a significant amount of data for a particular task, followed by a period of processing the downloaded data substantially without communication through CO 115. Accordingly, the connection provided between the subscriber and the CO may provide less bandwidth than desired for such instantaneous demand although a significant amount of bandwidth remains unutilized at other times. The subscribers are often forced to accept this solution due to their inability to afford the actual bandwidth utilized for bursts of information. Therefore, they accept the next closest constant bandwidth that is cost effective and provides tolerable communication speeds.

Similarly, where a subscriber has a relatively constant demand which exceeds the capacity of one or a combination of available links, i.e., requires 2 Mbps which is slightly more than the 1.544 Mbps available through a single T1 connection, the subscriber is required to purchase or lease additional links to carry the overflow demand, such as a second T1 connection to carry the remaining 0.456 Mbps, although the full capacity of this second link is not required. The subscribers are often forced to accept this solution because there is often no lesser increments of bandwidth available for purchase or lease to the subscriber. Therefore, they accept and pay for the next increment of offered bandwidth irrespective of the fact that only a fraction of this bandwidth may be needed and used.

In the above example of T1 lines, even ignoring the bottle neck associated with the service provider's limited number of connections to the CO, the subscriber will only have approximately 1 Mbps available to him at any time due to the capacity of the T1 line. This rate may be significantly slower than the data rate of the subscriber equipment (e.g., where a 100 Mbps user network is involved). The speed, for example, with which a web browser installed at a subscriber location can bring up a page is a function of the speed with which the received data is transmitted to the user location (i.e., the bits per second (bps)). Currently, to transmit a web page to a subscriber typically requires 17 Kbps of data to be moved to a subscriber's computer.

Obviously, increasing the bandwidth or pipe of the transmission line will increase the speed with which the data can be received (e.g., 17 Kbits of data transmitted over a 100 Mbit bandwidth is extremely fast as compared to 17 Kbits of data transmitted at 33 Kbps). However, as suggested above, purchasing additional bandwidth to service such needs is often cost prohibitive. The lack of economy in marginal increases in bandwidth is caused in part due to the practice of present telco's, or other provider's, tariffing schemes. Specifically, the tariffing schemes in common use typically cannot determine how much data is transmitted or received via the link and, thus, is not a measure of the actual bandwidth utilized by the subscriber.

For example, flat fee billing, also known as "all you can eat", is a tariffing scheme where the fee the provider charges does not reflect the subscriber usage. Subscribers are billed a set amount each billing period, typically monthly. Examples of services using flat fee billing rates, in addition to the above example of purchased T1 lines above, are local phone calling (residential) and dial-up (analog modem) Internet access. The flat fee billing scheme is simple for the service provider to implement and operate because it is architecture independent; the operator just prints a bill directly. In addition, flat fee billing is also easy for users to understand and to use in predicting what their service cost will be for any period.

However, flat fee billing creates several disadvantages for the network operators. For example, since the tariffing method does not differentiate between heavy users of the service and light users, low level users who increase their usage do not make any increased contribution to revenue while heavy users do not pay in proportion to their associated costs. Moreover, as there is no incremental cost to the subscribers, low level users may actually be incented to utilize more bandwidth than needed. Accordingly, this scheme tends to skew sales thrust to potentially light users. Further, the only way to increase revenue using flat fee billing is to enlarge the subscriber database.

Another common tariffing scheme for information communication links as described above is to monitor only the connection time, i.e., when the telephone is off hook and an information communication link is established, along with the type of service utilized (e.g., ISDN, dial tone), to determine a charge for the service provided. This tariffing scheme is sometimes referred to as "connect time" billing. According to this scheme, service providers accumulate information regarding the amount of time the subscriber is connected to the system. The connection time information is collected over a billing cycle period and the subscriber is billed in proportion to the amount of time they where connected to the service provider's network. Examples of services using connect time based billing rates are cellular (local calls) and business ISDN Internet access.

The connect time tariffing scheme overcomes many of the problems associated with the flat fee tariffing scheme. However, it should be noted that using the total connect time as a measure of the level of service, which cannot determine how much data is transmitted or received via the link, may not be very accurate in measuring the actual bandwidth utilized by the subscriber in many situations. For example, when dealing with data networking, a data network connection to a subscriber may be in existence without data transfer occurring (i.e., no active data traffic). Accordingly, connect time billing, although very simple to implement, is often only very loosely related to the actual utilization of the link by the subscriber. Accordingly, a subscriber may be required to pay for bandwidth not used or to establish and terminate the connection continually in order to avoid such over payment.

Traffic based billing is a more complex tariffing scheme in which the service provider has the ability to sample the data traffic flow over the billing period. The data flow information is collected over a billing cycle period and the subscribers are billed in proportion to the amount of data they transmitted over the service provider's network. For example, one provider, UUNet, samples each subscriber's data link, which must be established through a central point for sampling, every five minutes and measures the data rate at the sample time. From these measurements, a traffic profile is constructed that somewhat reflects how much service the subscriber has obtained over a billing period. Traffic based billing has advantages over both flat fee billing and connect time based billing from the operator's standpoint because it allows the operator to charge subscribers in proportion to their data service usage. Further, the flexibility of traffic based billing encourages usage patterns that favor the operator, e.g. time of day discounts, bulk usage discounts, or conversely heavy usage premium charges, etc.

With traffic based tariffing, the operator is able to charge subscribers in proportion to their network usage as related to network traffic associated with the subscriber, at least to the resolution of the sampling taken. However, with current implementations, the subscriber has no readily available means either to verify independently any of the usage, or to identify the activities of his operation which contribute to the traffic. For example, although the user can certainly discern the times at which the subscriber's system is inactive and active, the actual amount of communication bandwidth utilized by any particular operation of such a system is likely to be unknown. Accordingly, the bill a subscriber receives is essentially arbitrary, at least from the subscriber's vantage point, even if it reflects actual usage. Therefore, a disadvantage of this tariffing scheme is that the subscriber has no easy way either to predict or to control his expenditures on data services. Moreover, the typical traffic based tariffing schemes typically are unable to measure actual network resource utilization, and instead measure the bandwidth utilized through a single point.

Connect time and traffic based tariffing methods require some kind of billing data to be collected and processed into a bill for each subscriber. Accordingly, further opportunity for bottlenecking of information communication, as described above with respect to the shared connection to a service provider, is introduced. For example, ISPs typically do this by monitoring the connections to subscribers at a central point, usually the ISP's point of presence (POP). The connection monitoring measuring equipment (often a Frame Relay switch or a terminal server) outputs data for each user in a suitable format for a billing processor. At the end of each billing period, the billing processor calculates the user's bill based on the data submitted and the relevant billing plan applied.

FIG. 2 illustrates prior art implementation architecture. Subscriber computers (201A, 201B, 201C) which may transmit data to be routed to another network destination through a frame relay switch (213), a terminal server (209), a router (211) or through a dial up modem connection (207). The frame relay switch (213) and terminal server (209 provide subscriber information (e.g., connect time or a estimate of the amount of data transmitted) to the POP. The service provider uses the information collected to determine the fee that a subscriber should be charged.

The existing implementations, as outlined above, suffer from a number of serious limitations. For example, as illustrated in FIG. 2, the centralized architecture requires all traffic (i.e., both billing information and data) to be accounted to flow through the POP, regardless of destination. Computer user (201B) cannot transmit data directly to computer user (201C), but rather the data must first be transmitted to the terminal server (209) via dial up connection (203A, 219, 207). Even subscribers using Virtual Local Area Network (VLAN) service between nearby locations (not shown) must still send all their traffic (billing information and data) to the POP prior to routing the traffic to the final destination. This required routing (i.e., all traffic must flow through a central point) results in higher infrastructure costs for non-centralized traffic flows.

A further disadvantage of the prior art centralized architectures pertains to the lack of redundancy within the systems. Due to the single central routing point (i.e., POP), these systems are inherently prone to catastrophic failure should the POP location be compromised (fire, flood, earthquake, etc.).

SUMMARY OF THE INVENTION

An object of the invention is to provide information communication, such as that suitable for use in the transmission of signals such as voice and/or video as well as digital data communication including that of Internet access, to end users at user system native speeds and beyond, such as 100 Mbps Ethernet and even Gigabit Ethernet speeds, to provide a network which is seamless and invisible from the user's vantage point. The data services provided are preferably orientated to work with existing subscriber equipment (e.g., LANs, WANs and telephony devices) and networking configuration. Data services include LAN transport, Internet access, and virtual private networking.

Another object of the invention is to achieve lower network maintenance, management, and operating costs. Lower ongoing costs are possible given the flexible design options, advanced services, and reduced equipment requirements.

Another object of the invention is to provide for the transport and routing of IP based data communications across a wireless network.

Another object of the invention is to permit subscribers to predict or control expenditures on data services.

Another object of the invention is to permit service providers to charge subscribers in proportion to the amount of bit per second (bps), or other such measurement, they transmit.

Another object of the invention is to permit service providers to charge subscribers in proportion to their actual network usage, giving a resolution not only of a measure of usage through a single point on the network, but the particular portions of the network utilized and to what extent.

Another object of the invention is to provide a decentralized network where traffic is not required to travel through a single point of presence (POP), but rather may be routed in a more direct fashion while still providing the billing advantages offered by the present invention.

Another object of the invention is to provide a decentralize network where information can then be pre-processed locally, or sent directly to a central billing facility, for further processing, eventually resulting in the creation of the subscriber's bill.

Another object of the invention is to provide a decentralize network where only billing information flows back to a central point, rather than the data traffic.

Another object of the invention is to provide a system that allows user the potential to receive and/or transmit 100 Mbps or greater bps of data.

Another object of the invention is to allow subscribers to share the volume (i.e, each subscriber is provided the full volume of the bandwidth such as by only one subscriber receiving and/or transmitting data during a period of time) not the bandwidth (i.e., all subscribers are provided a portion of the bandwidth available).

Another object of the invention is to provide all subscribers with a data connection having throughput as experienced by the subscriber to meet or exceed that of the subscriber's system native communication speed, such as a 100 Mbps data connection where the subscriber utilizes systems having a system native 100 Mbps Ethernet connection.

Another object of the invention is to permit monitoring or tracking of the data received and/or transmitted by a subscriber.

Another object of the invention is to provide a high efficiency and fiber-like quality of service (QoS).

Another object of the invention is to permit monitoring of the Quality of Service (QOS) a subscriber receives and to provide a desired QOS, such as priority connection or routing when the network is busy. A further object of the present invention is to provide tariffing based on the QOS provided to the subscriber, preferably including graduation of fees as special services are implemented to provide a subscriber's desired QOS.

Another object of the invention is to provide an information communication service, such as telephony or data communication services, where subscribers are charged according to the bandwidth actually used and rather than the traditional access rates and tolls.

Another object of the invention is to provide a robust network by supplying multiple radio units, duplicate activity collection systems, service provider points of presence (POPs) and the like.

According to another aspect of a preferred embodiment of the invention, each node of a network is an access point to the network it collects the relevant traffic statistics for subscribers connecting at that node.

According to another aspect of a preferred embodiment of the invention, each node of a network is an access point to the network, which collects the relevant traffic statistics for subscribers.

According to another aspect of a preferred embodiment of the invention, each node of a network contains a network switching/control element.

According to another aspect of a preferred embodiment of the invention, each node of a network contains CPU, which collects information from the switching element.

According to one aspect of a preferred embodiment of the invention, a network architecture includes distributed processing capability, such as may be provided by Java, C++, or like languages, to provide both the operator and subscriber with up to the minute information about system and service performance. According to a feature of the invention, new services and capabilities can be rapidly added and downloaded to the network equipment without disruption to the network or the subscriber. Thus service problems are identified at the outset, while the subscriber gets "real time" feedback on the quality of service obtained plus the opportunity to access and test drive new features, etc.

According to an aspect of a preferred embodiment of the invention, a wireless data network, such as may be established utilizing millimeter wave technology to communicate via microwave transmission, provides inband management capabilities to address radios by a logical or physical address, such as a MAC address, or an Internet Protocol address. According to another aspect of a preferred embodiment of the invention, the data network provides a system where individual elements of the network have information regarding their performance flow back to a central point to allow management of the population of radios.

According to another aspect of a preferred embodiment of the invention, network information is transmitted throughout the entire radio network using an addressing scheme that includes the physical address or an Internet Protocol address. Accordingly, management of the network may be accomplished from a centralized location with only a single or a few points of presence on the network.

According to another aspect of a preferred embodiment of the invention, a wireless data network provides intelligent radio units that can collect, store and transmit data regarding the network and network subscribers. According to another aspect of a preferred embodiment of the invention, an intelligent router or other network element is utilized to identify network subscribers or their associated information communications in order to track the actual bandwidth usage by subscriber to provide information that may be used for network utilization management, allocation, and/or billing of the subscriber.

According to another aspect of a preferred embodiment of the invention, a routing directory that contains the logical and/or physical address for addressable network devices, such as routers located in the wireless network or subscriber equipment coupled to the network, which can be updated to incorporate new addresses and new features that may be down loaded without interrupting network services, such as via a control overhead channel. Such information may be utilized according to the present invention for a number of purposes, such as determining the network resources required for transmission of particular data packets, determining an alternate communication path in case of a fault or to avoid a particularly congested link or portion of the network in transmitting a data packet, etc.

According to another aspect of a preferred embodiment of the invention, a centralized network operations center is coupled to the data network that can manage the complete universe of network radios and/or provide other network services, such as a billing service that is based of the actual amount of bandwidth used by a subscriber.

According to one aspect of a preferred embodiment of the invention, a data network spans a plurality of nodes with point-to-point type radio link connections adapted to provide networking features of the present invention. The network preferably includes millimeter wave technology radio stations located at respective nodes, each radio station in radio communication with one or more other radio stations for communicating data between the stations. Also located at each node is a data interface device connected to receive data from the associated radio station. The data interface selectively routes data addressed to the node to the node. Data not addressed to the particular node is combined with data originating at the node and provided to the radio station for transmission to a subsequent node.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIGS. 5A and 5B illustrates network usage information monitored by preferred embodiments of the invention.

DETAILED DESCRIPTION

The present invention preferably employs a wireless network designed to deliver information, such as consistent with the typical telephony and data services, from a service provider, such as an ISP (Internet service provider) or LEC (local exchange carrier), and/or as between subscriber systems to metropolitan commercial subscriber locations. Preferred embodiments of such a network are shown and described in the above referenced patent application entitled "COMMERCIAL NETWORK TOPOLOGIES UTILIZING POINT TO POINT RADIOS."

Preferably, the network of the present invention incorporates system components necessary to connect a subscriber's application equipment (e.g., phones, private branch exchanges (PBXs), computers, etc.) to the service provider's equipment, (e.g., central office (CO) switch, Tandem switch, POP gateway, ISP server, etc.) or other subscriber's system equipment (e.g., phones, PBXs, computers, etc.). Accordingly, all the various functional tasks at the component level may be integrated to build a comprehensive, cohesive network solution. Integration at the component level is intended to provide a much higher degree of coordination and cohesion between network entities than has been achievable with networks that rely on the integration at the system level.

The network architecture utilized according to the present invention preferably includes a distributed set of non-hierarchal nodes, connected together via wireless links. Such a preferred embodiment network may be utilized to provide high bandwidth information communication over a large area, such as a metropolitan area, which includes the use of cooperating wireless links, preferably manageable through a centralized controller with inband signaling. Accordingly, nodes of the network can act both as termination points (i.e., connecting to the subscriber's or service provider's equipment) and/or as tandems, (i.e., routing traffic on to other nodes). Links between nodes can be point-to-point type, point-to-point-to-point type, or point-to-multipoint type links. Note that the architecture can support any topology, including star and linear, as well as ring and mesh configurations. This allows for significantly increased network resilience with alternate path routing providing for both link and node redundancy with geographic diversity.

The above described network system, although providing more efficient traffic routing, and therefore more efficient use of available network bandwidth, does not lend itself to traffic based tariffing based on central point data sampling as in the prior art. Accordingly, the present invention utilizes distributed network usage monitoring, as will be described below with reference to a preferred embodiment network system, in order to provide desired traffic based tariffing.

Figure 1:
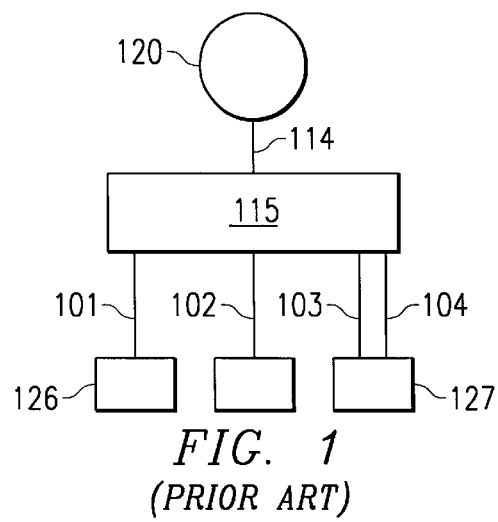
FIG. 1 illustrates a prior art solution for providing information communication between subscriber sites and a particular service provider point of presence.
Figure 2:
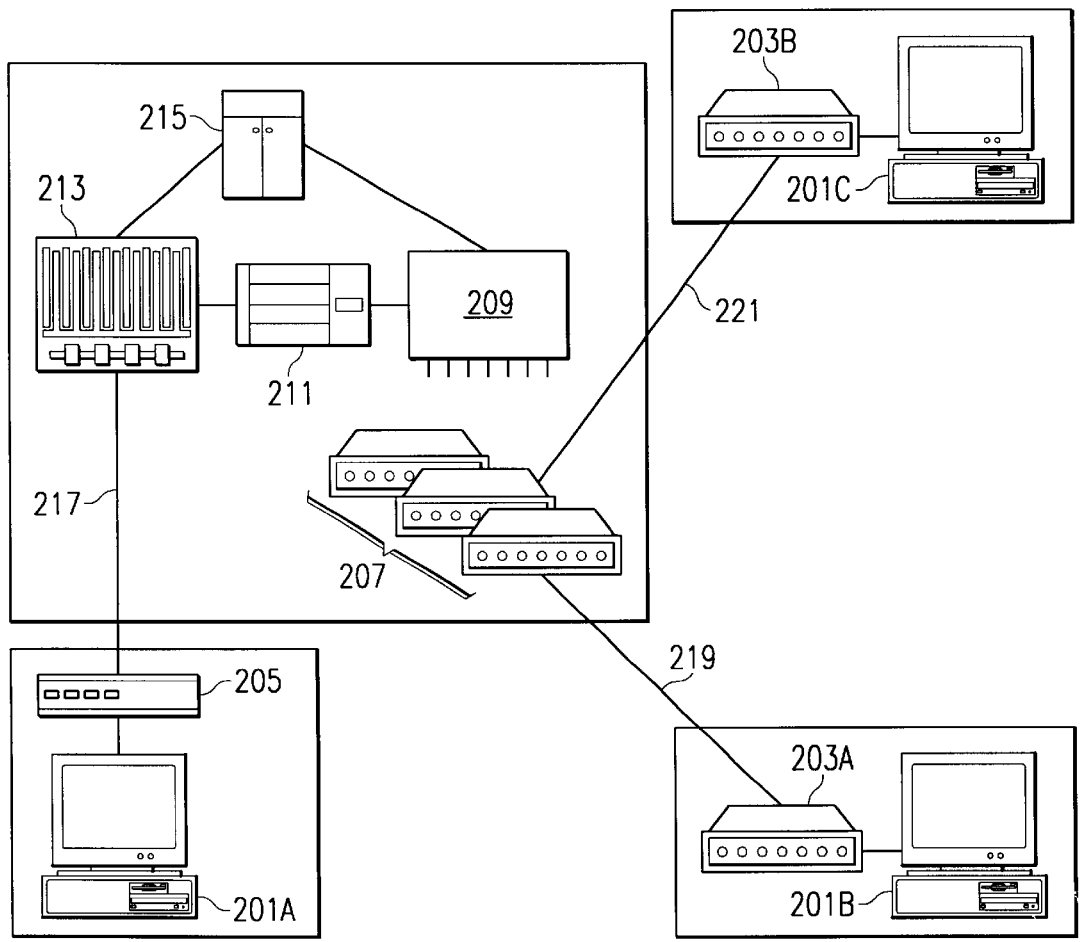
FIG. 2 illustrates a prior art system providing tariffing data collection through a central point.
Figure 3:
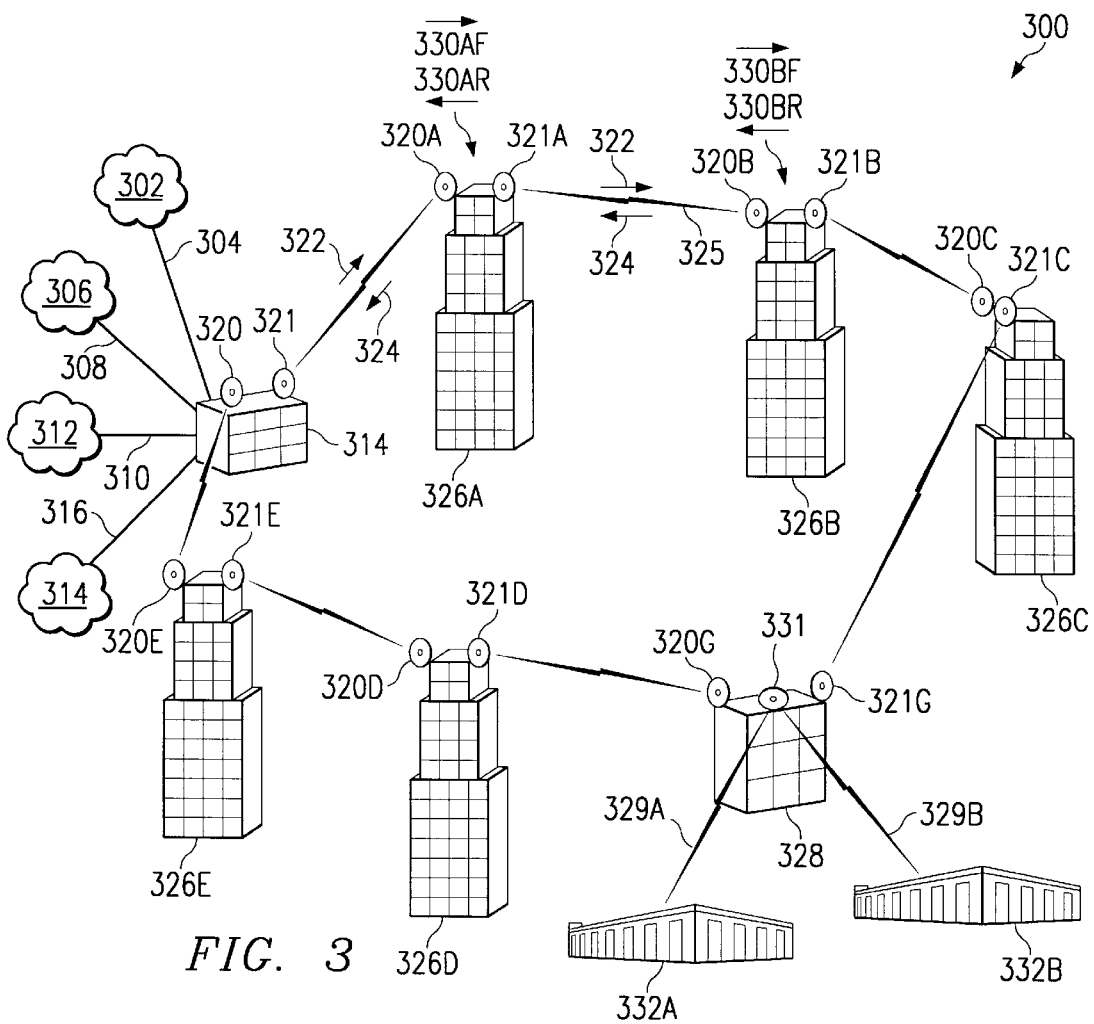
FIG. 3 illustrates a network including a preferred embodiment of the invention.

Directing attention to FIG. 3, a preferred embodiment wireless network system, network 300, suitable for use according to the present invention is shown. It shall be appreciated, however, that network systems other than that illustrated in FIG. 3 may be adapted to utilize the present invention. For example, there is no limitation to the network system so adapted to utilize a ring topology and, accordingly, other topologies, including star and linear, may be employed. Likewise, there is no limitation to the use of wireless links according to the present invention. Therefore, it will be appreciated by one of ordinary skill in the art that various networking systems, whether now existing or later to be developed, may be adapted according to the present invention as shown and described herein.

Network 300 of FIG. 3 includes, by way of example, seven primary nodes forming a bidirectional ring including a service provider point of presence (POP) node 314 and subscriber/subscriber nodes 326A–326E and 328. The POP node 314 preferably provides a gateway to access (such as through connections 304, 308, 310 or 316) a service provider or service providers, such as an Internet service provider (ISP) 302, a telco 306, or management nodes 312 and 314, and is connected to the subscriber nodes 326A–326E and 328 via point-to-point type microwave paths 325 forming the bidirectional ring. In further example of the various ways in which equipment may be placed in information communication through network 300, attention is directed toward subscriber nodes 332A and 332B connected to the network ring by respective point-to-multipoint type connections 329A 329B emanating from subscriber node 328.

The point of presence connection (POP) is preferably a gateway to external networks, such as the Internet via an ISP's server. The POP may also be the repository for all network configuration information, etc. In addition, the POP may have an Activity Collection System (ACS) located within the POP or remote from the POP, for collecting billing information (e.g., subscriber, usage, priority given during transmission) and network status information (e.g., the traffic levels of the network). Of course, an ACS may be deployed external to a POP, such as within a network operations control center utilized in maintaining and operating the radio links of the network, if desired.

Management nodes, such as management nodes 312 and 314 may provide various network operation, alarm, maintenance, and provisioning (OAM&P) functions. The management nodes may additionally or alternatively provide network services such as in the form of an activity collection system (ACS) node or other management collection unit. Management nodes may be a part of a network operations control center utilized in maintaining and operating the radio links of the network.

It should be appreciated that, although shown coupled to the network ring through a POP connection, management nodes operating according to the present invention may be coupled to the network at any location, including via a subscriber/subscriber node, according to the present invention. For example, in a preferred embodiment of the present invention, network management functionality is provided by an application program operable on a processor-based system, such as a general purpose computer system operable on a standard processor platform, such as that of the MOTOROLA 680X0 family or the INTEL 80X86 family of processors. Accordingly, a computer system coupled to, and in communication with, the network elements of network 300 as described above with respect to subscriber application equipment may provide the management functions, or a portion thereof, of the present invention.

Nodes forming the ring (i.e., POP node 314 and subscriber nodes 326A–326E and 328) preferably each include respective transceiver units (320, 321, 320A–G and 321A–G) for receiving radio signals, such as those in the microwave band of frequencies, from and transmitting the signals to adjacent nodes of the ring, thus permitting bidirectional data flow around the ring. For example, subscriber node 326B includes a transceiver 320B positioned to receive a radio signal from a transceiver 321A of node 326A. Data received from node 326A, which is not addressed to 326B, is forwarded directly or is combined with data originating at node 326B and forwarded, via link 330BF, for transmission by transceiver 321B to transceiver 320C of node 326C, which is the next node in the ring along the same direction. Alternatively, data received from node 326A which is addressed to node 326B is recognized and provided to subscriber, or other, equipment located at node 326B. Conversely, data received by transceiver 321B from next node 326C is examined and selectively forwarded to subscriber equipment located at node 326B or to transceiver 320B to be transmitted, directly or together with data originating at node 320B, to prior node 326A.

Accordingly, data originating at a particular node on the ring may be combined with data received at the transceiver of the node but not directed to that node for transmission to the next node on the ring. Such originated data may be all initially routed to a common point, such as POP 314, for subsequent routing, possibly including determination of a best path, to a desired destination, such as another node on the ring or other point in communication with the common point. Alternatively, in the preferred embodiment this originated data may be directly routed to the intended node.

Preferably, each origination node may simultaneously transmit data in both directions around the ring to provide redundancy for critical data or may reverse the direction of transmission to communicate with a particular node of the network when a more direct path is experiencing a fault or excessive communication traffic. Moreover, additional transceivers may be provided to alter the path of the transmission. For example, as more subscribers desire communication via the network, additional subscriber nodes may be deployed to link buildings or other locations not originally served by the network. These new links may be interjected between nodes of an existing link, such as between nodes 326A and 326B to thereby define a second link or "hop" between these two nodes. Additionally, or alternatively, such a new node may bridge a link between two more distant network nodes (nodes which are separated by a number of network links or "hops", such as nodes 326B and 326E) to thereby provide an alternate signal path in the network (i.e., split the ring into two rings) in addition to providing network services to this new node. Accordingly, these additional radios can create a robust network by rerouting data transmission traffic due to node failures, a subscriber priority, or timing/performance requirements. The number of required hops between particular nodes may also be reduced by the additional radios providing a new network path.

Network 300 may also provide data to individuals that are not part of the primary network signal path such as the preferred embodiment ring. For example, data transmitted from a service provider node 306, such as the ISP, having a destination address located within subscriber node 332A may travel through nodes 326D, 326E, and 328, as described above, until it reached the transceiver at node 331. Alternately, the data may have been transmitted using nodes 326A, 326B and 326C. Within node 331, the switch analyzes the data and determines that the data needs to be forwarded to node 332A. The switch will route the information via a link (not shown) to the transceiver 331, which may, for example, have an omnidirectional antenna for transmitting the signal to subscriber 329A via a point-to-multipoint type path.

By utilizing techniques of placing a plurality of subscriber nodes in communication with the primary network path, economics of deployment may be realized. For example, the subscriber nodes which are deployed in the primary network path, such as nodes 326A–326E, may provide network services into a commercial building (e.g., a high-rise office tower) to a subscriber location needing a relatively large amount of information communication capacity at a high bandwidth. Likewise, multiple subscribers within the building desirous of high bandwidth communications for burst type information communications, may justify the cost of a subscriber node. Accordingly, the cost of the radio units and attendant equipment may easily be justified for their use as compared to the costs/benefits of traditional communications links such as T1 or ISDN lines. Moreover, as additional subscribers desire the network services, additional subscriber nodes may be deployed, as described above, which take advantage of the network nodes already in place in order to be placed in communications with more distant systems (e.g., a service provider) without realizing the full cost of such a distant link.

However, less demanding users, although still desirous of high bandwidth communications for burst type information communications, may not be able to justify the full cost of a subscriber node. Accordingly, point-to-multipoint type links, as described above, may be utilized to provide high bandwidth information communications to these users although capacity, because the bandwidth which is available is shared among the multipoint subscribers, will be diminished. Additionally, there may be users which desire high bandwidth information communication but which cannot justify even the shared costs of a point-to-multipoint type link. These users can benefit from more traditional type link provided by cable modem or other such link, such as described in further detail in the above referenced patent application entitled "COMMERCIAL NETWORK TOPOLOGIES UTILIZING POINT TO POINT RADIOS.". Accordingly, a very inexpensive, and often already deployed, communication system may be leveraged to provide a gateway into the network system of the present invention.

Active devices of network 300 (transceiver, POP, Ethernet switch or IP router) preferably has its own address (i.e., MAC address), which is used to send network management information (status, configuration, alarms) between the active device and any OAM&P station currently logged into the device. In addition, these, or ones of the, devices are preferably enabled to allow distributed processing, allowing in to download and run applications such as program applets at will. This ability has great significance to the overall operational maintainability and profitability of the network, since it allows the operator to continuously update and upgrade device capabilities remotely over the entire lifetime of the network.

Accordingly, when a device, such as a router is first initialized or reset, it preferably first contacts a POP or other central control point to boot up and then to determine what software and/or firmware to download. For a cold start or newly installed device this is typically a diagnostics applet which checks out all the hardware functions for the device. Once completed, the central control point then downloads the device's configured personality, including all necessary application code, and parameters for the feature set required by the designated end user, such as quality of service level to be provided etc. This arrangement allows for all service parameters to be configured prior to installation of the device, thereby easing the logistics of service activation.

As an option, applets implementing SNMP proxy agent functionality for each device can also be deployed, which report back to network management positions such as HP Open View network management positions, thereby providing compatibility with SNMP-based legacy network management.

Figure 4:
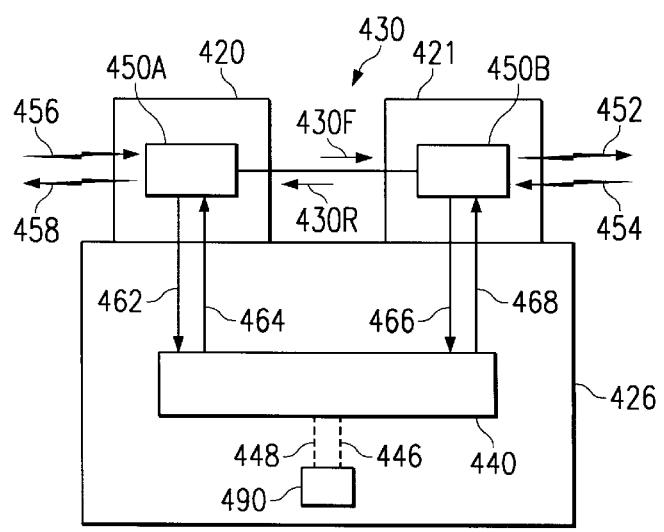
FIG. 4 illustrates a network node operable according to a preferred embodiment of the invention.

Referring to FIG. 4, a cross section of a node, transceiver 420 and 421 receive data from an adjacent node thought the wireless link 456 and 454, respectively, and transmit data to an adjacent node by the wireless link 458 and 452, respectively. Transceivers 420 and 421 are preferably coupled by a fiber optic, or other high bandwidth, cable such as link 430 providing full duplex in directions 430F and 430R. Of course, separate duplex cables or other links may also be provided, if desired. For example, a network management cable may be provided between transceivers 420 and 421 to communicate network control information, such as may be demultiplexed from a signal receiver at wireless links 452 or 458, generated by a controller or other intelligence coupled to the transceivers or is otherwise provided to the transceivers, there between. An intelligent switch or a router 440 connected to each transceiver 420 and 421 via preferably optical fiber or other high bandwidth, cables such as cables 462 and 464 and cables 466 and 468 respectively. Although a single router 440 is illustrated coupled to transceivers 420 and 421, it shall be appreciated that no such limitation exists in the present invention. For example, a plurality of routers may be utilized, such as a router coupled to node 420 and a separate router coupled to node 421. Of course, such as where a single piece of subscriber equipment utilizes the information directed to 426, router 440 may be omitted, if desired. Such a configuration may be used at a first node, such as node 420, and a router or other multiple termination point system utilized as another node, such as node 421, within a same building.

When data is received from 456 for example, a switch 450A, within transceiver 420, analyzes and determines the destination address of the data. If the address is not located within 426, the data is preferably forwarded directly or is combined with data originating at node 426 and forwarded, via link 430F, for transmission by transceiver 421 to the next adjacent node. If the address is located within 426, the data is sent into the building via cable 462 to the router 440, which transmits the data to the subscribers device. Accordingly, the only data that is required to travel within the building is the incoming data addressed for use at this node, or the data sourced at this node for transmission to other nodes. All the remaining data traffic may be examined for the destination address, or other indicium of data destination or information suitable for determining data destination, by the switch located in the it transceiver and directed to a proper destination without the need for the data to be brought down into the building. Thus any failures in the link might isolate a subscriber unit from the network, but will not interfere with any other network functions.

According to a preferred embodiment of the present invention, a switch, preferably an Ethernet switch, 450A or 450B is located at or within transceivers of the network. The switch or associated circuitry, such as the associated transceiver or a processor-based controller associated therewith, may be loaded, preferably at the time of initial manufacture or deployment, with tables that relate a physical address of a destination device (e.g., MAC address) to the location of the device within the network. The tables may be stored in a database for reference in routing communicated data. Moreover, the switch preferably has intelligence; that is, the switch may learn by creating or updating the tables.

When the switch receives a transmitted data packet, such as an Ethernet packet, a determination is made whether the data packet, which may have a data element that represents the logical or physical address of a destination device (e.g., MAC address, Internet protocol address, or the like), is intended for a subscriber device located within that building or whether the data needs to be transmitted to the next address. The switch may determine the location of the destination address by examining the data packet address and comparing this address to the destination addresses (e.g., MAC address, or an Internet Protocol address) stored in the database. For a data destination not located within the building, the information is transmitted via the data port through link 430 to the second radio located on the building for transmission to the next hop. If the destination address is associated with a subscriber within the building switches 450A or 450B directs the data to the router 440 for ultimate communication to the subscriber's termination equipment.

According to a preferred embodiment of the present invention, a record is made of the utilization of network resources by each subscriber at a point very near that subscriber's connection to the network. Accordingly, the need to route subscriber payload data to a centralized data collection point, or to otherwise case the subscriber payload data to be routed other than a most direct route to its destination, for purposes of assessing the subscriber's usage level, and thus tariffing level, is avoided.

For example, a preferred embodiment of the transceiver switch described above records how many bps were passed there through, or other measure of actual network utilization, in a data base identifying this information with a destination address (i.e., a particular subscriber, subscriber unit) or other identification information. This usage information may be stored in a database and processed by a processor at the transceiver, such as the above controller processor. An explanation of this process will be discussed later in description.

Additionally, or alternatively, router 440 is preferably an OSI model layer 3 device, such as an Internet protocol device. In particular deployment environments such a device will be a part of the network and therefore be outside of the subscribers purview. However, for other embodiments such a router may be provided by a subscriber to provide network information communications to a plurality of affiliated subscriber systems, such as those of a subscriber LAN. In another embodiment, the router may be collocated with the transceiver, thereby providing a plurality of subscriber connections into the building.

Router 440 receives/transmits data from/to transceivers 420 and 421 through connections 462, 464, 466 and 468. These connections may be a single cable such as using optical fiber, or multiple cables capable of carrying the necessary traffic which in the preferred embodiment is data rates of 100 Mbps.

Preferably, the router contains a routing information table, which contains information, such as, network number, routes to a particular destination, and metrics associated with those routes. Some of this information may be derived through recording a particular port a data packet originated from a particular piece of equipment was received upon. However, other of this information, such as network communication matrix information, i.e., which network elements are in communication with which other network elements, may be advantageously provided from an intelligent source, as will be further appreciated from the discussion below.

Preferably, the router or other intelligent switching apparatus of network elements is used to determine the best possible route to forward packets to a destination. As more network elements are connected and/or additional network signal paths are established, such as additional network links, the job of the router become more important. Preferably, these devices providing router functionality will be updated with routing information about the network, the network elements in communication therewith, and the information systems and/or services it can reach and the cost or the number of hop counts, such as from the above described management nodes.

The router will, at a first level, determine the destination route on the basis of the fewest hop counts need to reach the destination. However, these determinations may be adjusted according to dynamic conditions, such as the failure of a link or localized network traffic, in order to provide an improved path although involving more hops. As changes occur to the network, such as topology changes, a new route destination may be prove to be more cost efficient. Thus routing tables are preferably constantly or periodically updated. Moreover, as a communication route is preferably provided to these network elements to accomplish the above mentioned routing information updates, this link may be leveraged to provide additional features and functionality. For example, additional features may be added physically or downloaded to the router within seconds without interrupting the subscriber.

Moreover, routing decisions may be based on criteria such as a quality of service purchased by a subscriber. For example, when network traffic rises to a level that bandwidth as experienced by a subscriber is degraded, those subscribers purchasing a higher quality of service may receive priority routing, i.e., undelayed or substantially undelayed throughput, while those which have purchased a more basic level of service will experience delays in data transmission. Of course this quality of service routing hierarchy is applicable in other situations also, such as where a network element is malfunctioning or has failed and an alternate path is available for at least a portion of the affected network traffic.

For example, the router may have as many ports as there are subscribers in the building; having a port for each subscriber allows the router to see the subscriber as an individual. Accordingly, preferably through information stored in the memory of the router, such as via control communications from a management node, data associated with particular ones of these ports may be provided particularized routing services, such as the above described quality of service routing.

Additionally, or alternatively, the above mentioned data packet addressing, origination and/or destination, information may be utilized in referencing information stored in, or available to, the router to provide heirachacal routing. For example, where multiple subscribers are provided a point of presence on or to the network through a single interface port, address information within the data packets may be analyzed to determine a quality of service to be afforded to the transmission of the attendant payload. It should be appreciated that this analysis of address information requires little additional processing resources in the preferred embodiment as the operation of the network utilizes such address information in routing network communication.

The preferred embodiment of the present invention accumulates tariffing information based on the subscriber's actual use of the network. According to one embodiment of the present invention, router 440, switch 450A, switch 450B, and/or other network elements, monitor an attribute indicative of network utilization, such as actual data bit throughput in bps, and accumulate this information for each, or particular, network user. For example, as described above, a particular port used during a transmission of network data may be associated with a particular subscriber and, therefore, a measure of this network subscriber's usage of the network resources be made by measuring the bits passed there through. Similarly, switching of the data according to addressing information, as described above with respect to the transceiver switches, may be utilized to compile information regarding utilization of network resources associated with a particular network address, presumably associable with a particular network subscriber.

Accordingly, these network elements, already distributed throughout the network so that no extreme rerouting of subscriber payload is necessary to reach a tariffing data monitoring node, may be utilized to provide tariffing information for use in a traffic based tariffing technique. Specifically, a network control element (e.g., switch 450) contained within the transceiver of the preferred embodiment may record how many bps, or other measure of actual network utilization, were utilized in a data base identifying this information with a particular subscriber, subscriber unit or other identification information. In another embodiment, the router may record this information. Additionally, by recording the information in the router as well as other network elements, such as the aforementioned switch, provides a redundancy feature to the network, which allows usage data to be maintained in duplicate.

However, it should be appreciated that the measuring of network traffic associated with a particular subscriber at multiple points throughout the network provides benefit in addition to the redundancy described above. For example, where the measurement taken at a router providing the subscriber interface onto the network is simply the bits, or other benchmark, passed there through, although a good picture of bandwidth utilized at this one interface is provided, there is no clear indication of the actual network resources utilized by the subscriber. For example, if multiple users are coupled to router 440 and they communicate exclusively amongst themselves, the traffic measurement for these two subscribers may be the same as that of a subscriber coupled to router 440 and exclusively communicating with a subscriber located in a different building, and thus one or more wireless hops away. Although providing an easily implemented traffic measurement, and thus one which does not require considerable processing resources at the router, the full objectives of the present invention are not realized utilizing solely such an embodiment.

Accordingly, a preferred embodiment of the present invention utilizes the above described addressing information to determine a more accurate picture of network utilization by a subscriber. For example, through not only analyzing information indicating a particular port the payload data is communicated through, but also addressee and/or addressor information, a more complete picture of the network usage may be formed. By analyzing both the source of data and the destination of data, the amount of network resources required in the data transmission may be determined. Such an analysis would, for example, allow a network service provider to more accurately bill the user scenarios described above, wherein a subscriber sends data to another subscriber on the same, or a near by, router as opposed to transmitting the data through multiple links of the network.

This more detained picture of network usage may be formed through data collection in a number of ways. For example, the use of a single data collection point, such as the aforementioned router or other network element providing the subscriber's connection to the network, to analyze the addressee and/or addressor information of data packets communicated through particular interface ports may provide the detail of usage data desired. However, such a technique may require substantial processor capability in order to analyze such information on both incoming and outgoing data for each such interface port, such as where a large volume of subscriber payload data is communicated by the network.

Accordingly, distributed data collection sites may be utilized as mentioned above. According to this embodiment of the present invention, multiple network elements, such as various ones of the routers, switches, bridges, and/or the like acquire information regarding utilization. For example, various network elements may analyze data passed there through to record a particular subscriber for which some amount of data was handled, either directed toward this subscriber or received from this subscriber or both. Depending on the protocol of the data transmission, such a distributed system may allow the use of reduced processor capability and/or time at these network elements, although compiling a very clear picture of actual of the network by particular subscribers, as the network elements may be able to determine relevant information, such as an addressee of the data or an addressor of the data substantially from data already analyzed in performing the network elements functions, such as routing. Accordingly, in addition to providing data redundancy with respect to the tariffing data, such a preferred embodiment also provides a technique by which such tariffing data may be collected without introducing latencies in the network data throughput or requiring uneconomical processing systems to be deployed with in as a part of the network elements analyzing the data.

In a preferred embodiment of the present invention, tariffing data is accumulated at various points throughout the network as it is generated from analysis of the network traffic. For example, the network elements actually analyzing the network traffic may preferably have associated therewith memory, possibly structured as a database of particular subscriber's bandwidth usage through the particular network element.

Directing attention to FIG. 5A, one embodiment of such a database of information as stored a various network elements is shown. This embodiment of the database is especially useful where many network elements are also recording similar information as the detail collected is primarily the amount of data traversing the associated network element. For example, the illustrative database provides total bit count information during an indicated time frame (reference time stamp begin and end) which is associated with a particular subscriber address. Thus an accurate picture of network usage may be compiled through the use of a processor-based system, such as the aforementioned management nodes, to analyze and/or manipulate the data collected by various network elements to determine the network usage associated with particular subscribers.

The time stamps of FIG. 5A may be a time at which a last down load of the accumulated information, such as to an activity collection system (ACS) located in a management node, was conducted and, therefore, the beginning of the continued collection of data. However, it should be appreciated from the database of FIG. 5A that multiple such time stamps may be applicable. For example, referring to the entries associated with subscriber element address B, there are two such time stamp entries. The first beginning time stamp may coincide with the above mentioned download, or other common, event. However, the second beginning time stamp entry may be more unique to particular network events or the subscriber to which it is associated. For example, where a subscriber has purchased, or is otherwise privy to, a particular level of quality of service, an event affecting quality of service may have occurred at Mar. 11, 1999 8:23 PM, and is still on going, for which the subscriber associated with subscriber element address B is provided special data handling. Accordingly, a management node may be made aware of this event and, thereafter, tariff the subscriber according to any preferred data routing occurring during this event as evidenced by the information in the database. Of course, as described above, the particular network element handling this subscriber's data may also be aware of the occurrence of the event as well as the subscriber's particular quality of service level in order to provide the specialized handling of data in accordance with the desired quality of service level.

Additionally, or alternatively, one or more of the network elements may preferably operate to accumulate information in addition to that of the database of FIG. 5A. Directing attention to FIG. 5B, an alternative embodiment database is shown. Here an increased level of data collection is employed. Specifically, not only is the data associated with a particular subscriber network element determined, but information regarding the origination and destination of the data being handled is also accumulated. Accordingly, subscribers may be accurately tariffed for a particular quality of service provided by such network elements in both the forward and reverse links. Moreover, network usage information may be accurately derived with fewer network elements providing data compilation as network usage may be determined through reference to such information from routing matrixes using the addressor and addressee information.

It shall be appreciated that the data collected in the databases of FIGS. 5A and 5B are intended to be illustrative only, and are not intended to limit the present invention. Information in addition to, or in the alternative to, that shown may be utilized according to the present invention. For example, a measurement of network bandwidth utilized may be provided by packets transmitted/received rather than the measure of bits as used in the above examples. Additionally, further information may be derived, such as a particular type of service or function performed by the network element or otherwise utilized by the subscriber, in providing tariffing information useful according to the present invention. Performance based tariffing information may also be derived, such as a number of data packets given priority in transmission through the network or a time during or number of rerouted lower priority subscriber data to provide priority bandwidth to a particular subscriber.

The data derived and/or accumulated by the network elements of the present invention may be utilized in a number of ways. Preferably, as mentioned above, this information may be stored for later collection and analysis by a centralized intelligence, such as the management nodes of the network. Alternatively, rather than being collected initially by network nodes, the information may be collected at a higher order network element, such as may be disposed more near the particular network element disgorging the information, for further refining prior to forwarding to another source of intelligence, such as the aforementioned management nodes. In this embodiment the amount of raw data, and thus the required bandwidth for transmission, may be reduced by processing the raw collected data into that more suitable for the tariffing tasks to actually be performed with the data. Such a decentralized approach provides benefit in that not only may bandwidth necessary for transmission of the collected data be reduced, but processing equipment utilized for such refining of the data may be strategically deployed to reduce costs and complication of the network.

Moreover, information regarding a subscriber's usage of the network may easily be provided real time, near real time, at selected intervals, or upon query in order to keep the subscriber apprized of the network usage. Accordingly, the subscriber may tailor the usage to maximize the cost to advantage realized by use of the network and, at the very least, be informed to the point that the network service provider's billing is less arbitrary from the user's vantage point.

For example, the system may trade individual subscriber's usage in near real time and detect any significant variation in usage or usage patterns. This information may be utilized to notify the subscriber, such as by the immediate transmission of an e-mail, or other form, e.g. fax, or text to voice phone transmission, message to a subscriber system administrator. Accordingly, not only may the present invention operate to provide subscribers with usage based billing, but the present invention may also provide notification of changes in usage, such as when usage increased or even when usage drops, such as may indicate a malfunction or failure of subscriber equipment that the subscriber may not yet even be aware of. Moreover, the present invention may provide notification of changes in usage patterns which may be of interest to the subscriber, such as increased traffic during certain periods of the day indicative of subscriber employees unauthorized use of the Internet to receive broadcast programing or the malfunction or failure of subscriber equipment causing rerouting of data through the network. This aspect of the present invention facilitates the subscriber's ability to predict and control costs associated with their use of the network.

In a preferred embodiment, the transceivers operate under the control of a control system such as provided by CPU (not shown). It shall be appreciated that CPU may include memory storing an algorithm providing desired control according to the present invention. Moreover, operation of CPU may be configured to interrogate the network elements, such as the switch or the router, for information regarding the data used by the ports (i.e., the subscribers) and may store the information locally or transmit it back to a activity collection unit. If the information is stored locally, the information can then be processed locally where a bill may be generated and sent via e-mail or other network notification method to the subscriber's communications device. The information may also be pre-processed locally (all billing calculation completed) and sent to a central billing center to generate and to send the bill. The information may also be transmitted directly to a central billing facility, for further processing, eventually resulting in the creation of the subscriber's bill. For example, the above mentioned ACS may collect data that the transceivers and/or other network elements have interrogated from the lower order network devices (switch/router) or have derived from the data passed there through. This module can provide billing or invoicing features. With the information collected by the ACS, a network service provider may bill a subscriber for the amount of network communication services utilized or the Quality of Service (QOS) that was received, such as priority connection or routing when the network is busy.

This method allows the system to track or monitor subscriber usage without routing the transmitted data to a central point, only billing information need be transmitted through a central point and, depending on the level of decentralization employed as described above, even this data may not be transmitted to a central point. Additionally, the subscriber is charged for only the amount of bandwidth that the subscriber used and not the bandwidth that was available, although not fully utilized. This is a great advancement over a typical T1 line installation where a subscriber must buy the link regardless of how much data is actually transmitted. Likewise, this is a great advancement over a shared or multiplexed T1 installation where multiple subscribers may share the bandwidth among many subscribers without any way of identifying or recording a subscriber utilization for billing purposes.

It shall be appreciated that, although a preferred embodiment of the present invention has been described above with reference to the use of transceivers, communication equipment other than that generally referred to as transceivers may be used. For example, radio receivers and transmitters may be deployed at the nodes of the network, such as where communication in one direction around a network ring topology is desired or where a discrete receiver and transmitter pair is desired rather than a transceiver unit. Additionally, although the reference herein has been made to a network interface card, there is no limitation to the present invention being embodied in a configuration conventionally thought of as a "card." For example, the functionality of the NIC of the present invention may be embodied in large or vary large scale integration. Additionally, or alternatively, the functionality, or portions thereof, may be provided by software or firmware control of circuitry adapted to provide, or also providing, other functionality described herein, thus proving a "virtual device" embodiment of the network interface card.

Additionally, it shall be appreciated that, although microwave communication has been described with reference to a preferred embodiment, there is no limitation of the present invention to a particular form of communications. For example, a preferred embodiment of the present invention utilizes millimeter wave technology for providing communications. However, provided that communications may be established with sufficient distance, reliability, and bandwidth, the present invention may rely upon the use of spectrum outside that of the microwave spectrum, including even various unlicensed bands, if desired.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system providing network subscriber usage tariffing, said system comprising:

a plurality active network elements each having a memory in communication therewith, wherein said active network elements are adapted to derive network usage information associated with particular subscribers and store the derived information in the memory; and an activity collection system in communication with network elements of said plurality of active network elements, wherein said activity collection system is adapted to interrogate said network elements in communication therewith to collect the stored derived information, and wherein said activity collection system includes processor-based circuitry operable to analyze the stored derived information interrogated from multiple ones of said network elements to provide tariffing of particular subscribers commensurate with their associated network resource utilization.

2. The system of claim 1, wherein said network usage information is derived from address information associated with packets of subscriber payload data.

3. The system of claim 1, wherein said network usage information is derived from a particular interface port of the active network element user payload data is passed.

4. The system of claim 1, wherein said network usage information is derived from a particular function performed with subscriber payload data.

5. The system of claim 1, wherein said network usage information includes address information subscriber payload data is directed toward.

6. The system of claim 1, wherein said network usage information includes address information subscriber payload data is provided from.

7. The system of claim 1, wherein said network usage information includes a bit count associated with the transmission of user payload data.

8. The system of claim 1, wherein said network usage information includes a packet count associated with the transmission of user payload data.

9. The system of claim 1, wherein said network usage information includes a temporal data element.

10. The system of claim 9, wherein said temporal data element demarks a beginning of accumulating an amount of user payload data volume transmitted.

11. The system of claim 10, wherein said beginning of accumulating an amount of user payload data volume corresponds to a time at which said activity collection system interrogated said network element.

12. The system of claim 9, wherein said temporal data element demarks an end of accumulating an amount of user payload data volume transmitted.

13. The system of claim 12, wherein said end of accumulating an amount of user payload data volume transmitted corresponds to a network event affecting the quality of service of a subscriber associated with the user payload data.

14. The system of claim 1, wherein said memory in communication with each active network element of the plurality of network elements is local to the associated active network element.

15. The system of claim 14, wherein network elements of said plurality of active network elements comprise at least two groups, a first group of said network elements being primary data collection network elements and a second group of said network elements being secondary data collection network elements.

16. The system of claim 15, wherein said first group of network elements are responsive to interrogation by said activity collection system.

17. The system of claim 15, wherein said first group of network elements comprise processor-based systems operable to refine said derived information.

18. The system of claim 17, wherein ones of said first group of network elements are operable to provide at least a portion of said refined derived data to subscriber units in communication therewith via network connections.

19. The system of claim 15, wherein said second group of network elements are unresponsive to interrogation by said activity collection system.

20. The system of claim 15, wherein said second group of network elements passively collect network usage information for provision to external processor-based systems for refining of the derived data.

21. The system of claim 15, wherein network elements of said second group of network elements store said derived network usage information in the memory local thereto for provision to an associated network element of said first group of network elements.

22. The system of claim 21, wherein provision of said derived network usage information from network elements of said second group of network elements to an associated network element of said first group of network elements is independent of said interrogation by said activity collection system.

23. The system of claim 21, wherein said associated network element of said first group of network elements is a network element of said first group of network elements disposed a shortest distance via network connections from said network element of said second group of network elements associated therewith.

24. The system of claim 1, wherein network elements of said plurality of active network elements comprise at least two groups, a first group of said network elements being primary data collection network elements having said memory in communication therewith disposed local thereto and a second group of said network elements being secondary data collection network elements having said memory in communication therewith disposed remotely thereto.

25. The system of claim 24, wherein said derived network usage information of network elements of said second group of network elements is stored at an associated network element of said first group of network elements.

26. The system of claim 1, wherein said activity collection system is a processor-based system deployed as a network node.

27. The system of claim 26, wherein said network node a management node associated with a network service provider, and wherein substantially only network operation, alarm, maintenance, and provisioning data including said network usage information is communicated thereto by network connections.

28. The system of claim 1, wherein said tariffing of particular subscribers reflects an achieved level of performance as determined by said activity collection system from the stored derived information interrogated from multiple ones of said network elements.

29. The system of claim 1, wherein said tariffing of particular subscribers reflects an achieved quality of service as determined by said activity collection system from the stored derived information interrogated from multiple ones of said network elements.

30. The system of claim 1, wherein said tariffing of particular subscribers reflects an actual amount of utilized bandwidth as determined by said activity collection system from the stored derived information interrogated from multiple ones of said network elements.

31. The system of claim 1, wherein said activity collection system is further adapted to analyze the stored derived information interrogated from multiple ones of said network elements to determine changes in particular subscribers' network resource utilization.

32. The system of claim 31, wherein said changes in particular subscribers' network resource utilization are associated with an amount of network resource utilization.

33. The system of claim 31, wherein said changes in particular subscribers' network resource utilization are associated with a change in network resource utilization patterns.

34. The system of claim 31, further comprising:
a messaging system in communication with said activity collection system providing notification of changes in particular subscribers' network resource utilization to said particular subscribers as determined by said activity collection system.

35. The system of claim 34, wherein said notification is via e-mail.

36. A method for providing network subscriber usage tariffing, said method comprising the steps of:
deploying a plurality active network elements in a data network to provide network data communication there through;
providing communication between each network element of said plurality of network elements and a corresponding memory;
operating said network elements to derive network usage information associated with particular subscribers;
storing the derived information in the memory in communication with a particular network element deriving the information; and
deploying an activity collection system in said data network;
providing communication between network elements of said plurality of active network elements and said activity collection system;
operating said activity collection system to interrogate said network elements in communication therewith;
collecting the stored derived information at said activity collection system in response to said interrogating step; and
analyzing the collected stored derived information to provide tariffing of particular subscribers commensurate with their associated network resource utilization.

37. The method of claim 36, wherein said operating said network elements step comprises the step of:
deriving said network usage information from address information associated with packets of subscriber payload data.

38. The method of claim 36, wherein said operating said network elements step comprises the step of:
deriving said network usage information from a particular interface port of the active network element user payload data is passed.

39. The method of claim 36, wherein said operating said network elements step comprises the step of:
deriving said network usage information from a particular function performed with subscriber payload data.

40. The method of claim 36, wherein said network usage information includes address information subscriber payload data is directed toward.

41. The method of claim 36, wherein said network usage information includes address information subscriber payload data is provided from.

42. The method of claim 36, wherein said network usage information includes a bit count associated with the transmission of user payload data.

43. The method of claim 36, wherein said network usage information includes a packet count associated with the transmission of user payload data.

44. The method of claim 36, wherein said network usage information includes a temporal data element.

45. The method of claim 44, wherein said temporal data element demarks a beginning of accumulating an amount of user payload data volume transmitted.

46. The method of claim 44, wherein said temporal data element demarks an end of accumulating an amount of user payload data volume transmitted.

47. The method of claim 46, wherein said end of accumulating an amount of user payload data volume transmitted corresponds to a network event affecting the quality of service of a subscriber associated with the user payload data.

48. The method of claim 36, wherein said corresponding memory in communication with each active network element of the plurality of network elements is local to the associated active network element.

49. The method of claim 48, further comprising the steps of:
identifying a first group of said network elements being primary data collection network elements; and
identifying a second group of said networks elements being secondary data collection network elements.

50. The method of claim 49, further comprising the step of:
operating said first group of network elements to interrogate corresponding ones of said second group of network elements.

51. The method of claim 50, wherein said operating said activity collection system step comprises the step of:
interrogating said first group of network elements without directly interrogating said second group of network elements.

52. The method of claim 49, further comprising the step of:
operating said first group of network elements to refine information interrogated from said corresponding ones of said second group of network elements.

53. The method of claim 36, wherein said analyzing step comprises the step of:
tariffing particular subscribers as a function of an achieved level of network performance as determined by said activity collection system from the stored derived information interrogated from multiple ones of said network elements.

54. The method of claim 36, wherein said analyzing step comprises the step of:
tariffing particular subscribers as a function of an achieved quality of network service as determined by said activity collection system from the stored derived information interrogated from multiple ones of said network elements.

55. The method of claim 36, wherein said analyzing step comprises the step of:
tariffing particular subscribers as a function of actual amount of utilized bandwidth as determined by said activity collection system from the stored derived information interrogated from multiple ones of said network elements.

56. The method of claim 36, wherein said analyzing step comprises the step of:
determining changes in particular subscribers' network resource utilization.

57. The method of claim 56, wherein said determining changes step comprises the step of:
determining changes in particular subscribers' network resource utilization associated with an amount of network resource utilization.

58. The method of claim 56, wherein said determining changes step comprises the step of:
determining changes in particular subscribers' network resource utilization associated with a change in network resource utilization patterns.

59. The method of claim 56, further comprising the step of
providing notification of changes in particular subscribers' network resource utilization to said particular subscribers as determined by said activity collection system.

60. A data network system spanning a plurality of nodes with radio link connections, said data network system comprising:
a plurality of radio stations located at respective ones of said nodes, each radio station in radio communication with at least another one of said radio stations for communicating data there between; and
a plurality of network elements, ones of said network elements disposed at respective ones of said nodes, each of said network elements disposed to communicate network data through said radio link connections, wherein ones of said network elements are adapted to ascertain network utilization information respective to particular network devices coupled to said data network through the use of a data collection unit connected to said network element and a processing unit connected to said data collection unit for acquiring information from said network element to update a database in communication with said processing unit.

61. The system of claim 60, further comprising:
a data analysis module adapted to analyze data of a database associated with said ones of said network elements to provide network utilization information specific to particular users of said network system.

62. The system of claim 61, further comprising:
a messaging module adapted to provide said particular users with near real time notification of network utilization.

63. The system of claim 62, wherein said notification is provided in response to a change in network resource utilization magnitude.

64. The system of claim 62, wherein said notification is provided in response to a change in a network resource utilization pattern.

65. The system of claim 60, further comprising:
a data acquisition module adapted to collect data network utilization information from said database.

66. The system of claim 65, wherein said collection of said data network utilization information is substantially autonomous upon the occurrence of a condition.

67. The system of claim 66, wherein said condition is a time corresponding to a billing cycle of a network service provider operating said data network.

68. The system of claim 66, wherein said condition is a query by a user.

69. The system of claim 68, wherein said user is a subscriber of network services of said data network.

70. The system of claim 68, wherein said user is a system administrator of said data network.

71. A data network system spanning a plurality of nodes with radio link connections, said data network system comprising:
a plurality of radio stations located at respective ones of said nodes, each radio station in radio communication with at least another one of said radio stations for communicating data there between; and a plurality of network elements, ones of said network elements disposed at respective ones of said nodes, each of said network elements connected to communicate network data through said radio link connections, each of said network elements adapted to ascertain network utilization information respective to particular network devices coupled to said data network through the use of an interrogating unit connected to said network element and a central processing unit connected to said interrogating unit for interrogating information from said network element to update a database in communications with said network element accordingly.

72. The system of claim 71, further comprising:

a data acquisition module adapted to collect data network utilization information from said database.

73. The system of claim 72, wherein said collection of said data network utilization information is substantially autonomous upon the occurrence of a condition.

74. The system of claim 73, wherein said condition is a time corresponding to a billing cycle of a network service provider operating said data network.

75. The system of claim 73, wherein said condition is a query by a user.

76. The system of claim 75, wherein said user is a subscriber of network services of said data network.

77. The system of claim 75, wherein said user is a system administrator of said data network.

* * * * *